E. SCHAUFFELBERGER.
FLEXIBLE COUPLING.
APPLICATION FILED SEPT. 19, 1916.

1,268,632.

Patented June 4, 1918.

Inventor:
Emil Schauffelberger,
By Wilkinson, Guiota Mackaye
Attorneys

UNITED STATES PATENT OFFICE.

EMILE SCHAUFFELBERGER, OF PUTNEY, LONDON, ENGLAND.

FLEXIBLE COUPLING.

1,268,632.    Specification of Letters Patent.    Patented June 4, 1918.

Application filed September 19, 1916. Serial No. 121,048.

*To all whom it may concern:*

Be it known that I, EMILE SCHAUFFELBERGER, a citizen of the Swiss Republic, residing at 119 Kenilworth court, Putney, London, S. W., England, have invented a certain new and useful Improved Flexible Coupling, of which the following is a specification.

This invention relates to flexible couplings and has for its object to provide an improved and simplified device of this nature which may be cheaply constructed and which shall be more efficient in operation than such devices as hitherto adopted.

The invention consists in a flexible coupling comprising a driving and a driven member and a resilient band or strip connecting said members.

The invention also consists in a flexible coupling of the above character in which the resilient band or strip is of a sinuous form and is held in position by pins or projections upon one or both members of the coupling.

The invention also comprises other details and arrangements hereinafter more particularly referred to.

The accompanying drawings illustrate three modes of carrying out the invention.

Figure 1 is an elevation partly in section showing one convenient form of coupling in accordance with the invention, while

Fig. 3 is a similar view to Fig. 1 showing a modified form of coupling, while

Figure 1:
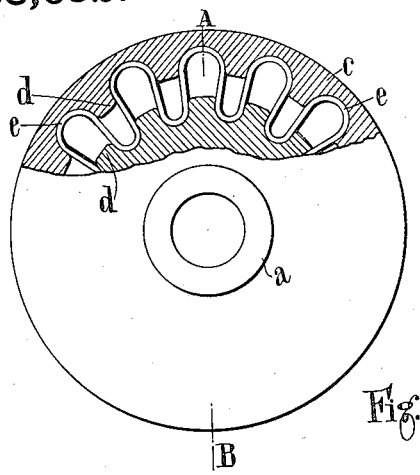
Figure 2:
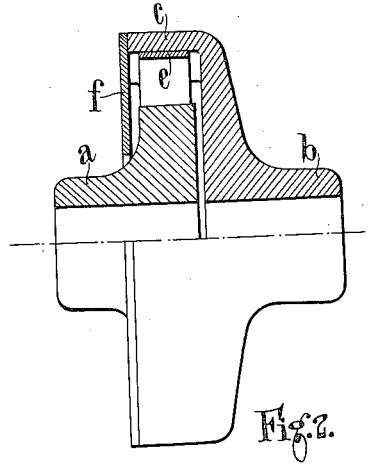
Fig. 2 is a sectional elevation upon the line A—B of Fig. 1.

In carrying my invention into effect in one convenient manner as illustrated, for example, in Figs. 1 and 2 I form my improved coupling from two members $a$ $b$ which are so constructed and arranged as to be entirely out of contact with one another and one of which, $b$ for example, is formed with a flange or rim $c$ adapted to surround the periphery of the member $a$. Each of the members is formed with tooth-like projections $d$ placed in staggered relation to one another and embedded between such projections is a resilient band or strip $e$ of suitable material as, for example, steel, the band being given a sinuous or wave-like form by reason of its being held between the projections of the respective members, and an annular disk $f$ may be fitted over the face of the members in the manner shown. The arrangement is such that the band is capable of smoothly and efficiently transmitting the drive from one member, which may be the driving member, to the other, which may be the driven member, and the transmitting member is so selected as to be capable of taking up bending stresses so that the heavy wear and tear occurring in well-known rope couplings is entirely obviated.

In order to minimize friction losses and heating of the coupling the latter may be partially filled with oil which during the running is driven outwardly under the action of centrifugal force and thus completely lubricates the transmission band or strip.

Figure 3:
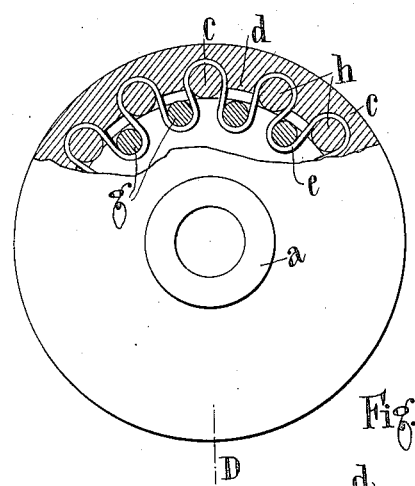
Figure 4:
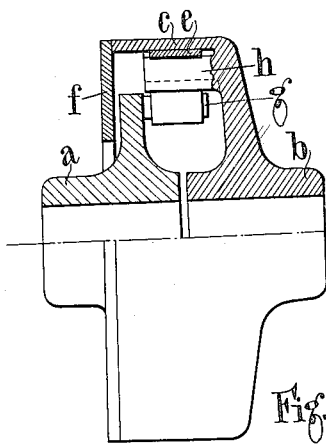
Fig. 4 is a section upon the line C—D of Fig. 3.

In the modified form of coupling illustrated in Figs. 3 and 4 the two parts of the coupling $a$ $b$ are fitted respectively with the axially arranged pins $g$ $h$ placed similarly to the tooth-like projections before mentioned and around which the resilient band or strip is passed, the strip being embedded between the tooth-like projections $d$ formed between the axial pins $h$, these tooth-like projections, however, being omitted, if desired, and in any modification the band may be placed in position with or without clearance between the coupling members.

Figure 5:
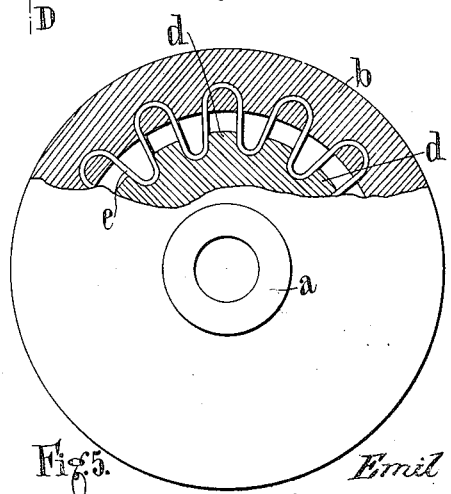
Fig. 5 is an elevation partly in section showing a further modification in accordance with the invention.

Instead of having the resilient band laid loosely between pins or projections it may, if desired, be cast with or otherwise rigidly secured to the outer or to the inner member. Fig. 5 shows an example of this modification in which the band is rigidly secured to the member $b$ and embedded between tooth-like projections $d$ upon the member $a$.

When it is desired to form a clutch one of the coupling members may be movable axially upon its shaft.

It is to be understood that the invention is not to be confined to the details of construction hereinbefore given by way of example as I may modify the form and arrangement and material of my resilient band and the method of mounting the same in position depending upon the form of coupling to which the invention is to be applied and the purpose for which it is to be employed.

Having now described my invention, what

I claim as new and desire to secure by Letters Patent is:—

In a flexible coupling, the combination with two concentric annular members spaced apart and each provided with oppositely-disposed radial grooves, and a resilient band projecting into said grooves and forming a series of U-shaped loops connecting said members, substantially as and for the purposes described.

In testimony whereof I have signed my name to this specification.

EMILE SCHAUFFELBERGER.